United States Patent Office 2,977,182
Patented Mar. 28, 1961

2,977,182

METHOD OF STERILIZING SURGICAL GUT WITH LIQUID ETHYLENE OXIDE

Charles Carroll Adams, 1461 N. Michigan, and Walter K. Gillett, 928 Elizabeth St., both of Pasadena 6, Calif.

No Drawing. Filed Aug. 13, 1958, Ser. No. 754,711

5 Claims. (Cl. 8—94.11)

This invention has to do with the treatment of catgut to provide sterile absorbable surgical gut.

Absorbable surgical gut is made from the intestines of animals, generally sheep. These intestines are split into narrow ribbons, treated to remove fatty and mucosal tissue, leaving only a submucosal layer which consists chiefly of collagen. Two or more ribbons are twisted together, dried under tension, and polished to make the basic gut string. Such strings must then be treated to meet the many requirements of surgical gut, the principal ones being that the gut be absolutely sterile, have a definite rate or period of absorption, and be non-toxic and non-irritating. Secondary requirements are that it meet certain standards of tensile strength, be of a given thickness, have its component ribbons firmly bonded together, be smooth and free from spicules or rough areas, be flexible and easy to handle and tie, be free of any substance that might contribute to knot slippage, and be free from tendency to swell excessively in the body tissues.

By present and prior methods used in the treatment of the basic gut, so far as we know, the steps taken to insure sterility and to meet the requirement of absorption by the human body have been such that the methods fall short of satisfying one or more of the secondary requirements mentioned above. In this connection, because of their density, gut strands are very difficult to sterilize effectively with previously used chemical means and, consequently, heat is conventionally used as the sterilizing agent. Also the collagen of the basic gut strand must be subjected to a coagulating treatment or denaturing process so that the strand can be dissolved or absorbed by the body and will not remain as a foreign substance therein. The difficulty of using heat to accomplish sterilization is that the temperatures required carry the denaturing process too far thereby necessitating supplemental treatment to enable the gut to resist absorption for the period necessary for surgical use. Also, heat has the unfortunate effect of lowering the tensile strength and of contributing to stiffness and kinking. Consequently, gut manufacturers have been compelled to subject the sterilized gut to relatively harsh tanning operations to partially restore resistance to absorption. This involves treating the gut with several baths which are deleterious to the physical structure and contribute to roughness and to separation of the ribbons or plies.

It is therefore a primary object of our invention to provide a novel and improved method or process of producing surgical gut which does not have the disadvantages of conventional and prior methods especially those depending upon heat for sterilization. In this connection, it is an object to provide a process by means of which it is possible to produce a surgical gut which meets all the required and desired qualities heretofore mentioned and which is markedly superior to surgical gut now being used.

Another object is to provide a relatively simple, novel and economical method for processing gut for the purpose of rendering it especially suitable for use in surgery.

Still another object is to provide an improved, novel treated gut for use in surgery.

These and other objects will be apparent from the following description.

It is our concept that most of the defects of conventional processes for producing surgical gut can be eliminated if the basic gut strand is sterilized by treating it with an effective agent lacking the destructive features of heat and the irritative properties of well-known chemical germicides and if a mild consolidating agent is used, which denatures collagen at a controllable degree, making it possible to stop the denaturing process at a point which would insure the gut strand resisting absorption for the required period after insertion in the tissues. We have found that ethylene oxide and ethylene carbonate are unusually well suited for use in sterilizing the basic gut strand. The latter has certain advantages over the former in that it is relatively non-volatile, is non-explosive, and has lower toxicity. Each has the ability to penetrate the gut and effect positive sterilization through destruction of all bacteria and spores without adversely affecting the strength or flexibility of the strand, without leaving any irritative substance, and without adversely affecting its compatibility with human tissues. Also, each coagulates or denatures the collagen depending upon the time of exposure, the amount of moisture present and the temperature.

Because of its above-mentioned advantages, we prefer to use ethylene carbonate. Its efficacy as a sterilizing agent and as a denaturant is increased in the presence of moisture, as in the case of other ethylene compounds. For maximal efficiency in sterilization, the amount of moisture in the material being processed should be controlled with reasonable accuracy and, in the case of gut, the control should be precise because of the relation between the moisture content and the degree of denaturing in a given period of time at a given temperature. The moisture content can be adjusted by immersion in alcohol of the desired aqueous content preliminarily as will later be explained, however, in place of this, water may be added directly to the ethylene compound itself. In the case of liquefied ethylene oxide, the water reduces its volatility, while in the case of ethylene carbonate, the water deters it from solidifying. We find a moisture content of 5% to 7% to satisfy the criteria above.

We prefer to regulate the degree of denaturing of the gut resulting from the action of the ethylene compound by varying the duration of exposure thereof to the compound rather than by varying the temperature and/or aqueous content thereof, and we therefore carry out the method at the lowest temperature that will maintain the ethylene carbonate in a liquid state of minimal viscosity. By this we mean that the ethylene carbonate is maintained just above the temperature at which it would solidify. In treating the gut it is important that the exposure to the ethylene compound be completely terminated at the end of the treating period, since if any of the compound is allowed to remain in contact with the gut, it continues to denature the gut. One of the most effective means of removing residual ethylene from the material being treated is to immerse the material in alcohol. By removing all traces of the ethylene compound we are able to obtain much more precise control than is possible where an ethylene compound is left in contact with the packaged product for the sterilization thereof, as has been suggested in the art. When we refer to ethylene oxide or ethylene carbonate we refer to the liquid article of commerce. Thus liquid ethylene oxide is defined in Chemicals of Commerce by Snell and Snell published by D. Van Nostrand, second edition, 1952, as the compound sold in pressure cylinders having a boiling point of 13.5° C. Ethylene carbonate is shown to have a weight of 11.1 lbs. per gallon in "Encyclopedia of Chemical Technology" by Kirk and Othmer published by Interscience Encyclopedia, Inc., New York, 1949 edition, volume 3, page 152.

By way of example, the following is a practical method of sterilizing gut to conform with U.S.P. specifications for Type A-Plain surgical gut. Type A is relatively quickly absorbed as appears from the following table:

| U.S.P. Type | Absorption Period (Dependent upon size) |
| --- | --- |
| A—Plain (untreated) | 5–8 days. |
| B—Mild Treatment | 10–12 days. |
| C—Medium Treatment | 20–25 days. |
| D—Extra Treatment | 35–45 days. |

The gut to be sterilized is immersed in ethylene carbonate containing about five percent water by volume. The ethylene carbonate should be in a liquid state, and we prefer to maintain it at a temperature of about 45° C. Any temperature in the range from 45° C. to about 60° C. may be used. The material is kept in the carbonate at this temperature for about 45 minutes or within a range of from 45 to 55 minutes. At the end of the treating period the ethylene carbonate is drained off and replaced by 90 percent isopropyl alcohol, or other non-toxic alcohol. The alcohol should exceed the volume of the material being treated by at least about 30 percent. The work should be actively agitated for several minutes to insure removal of all surface ethylene carbonate. The contaminated alcohol is then drained off and replaced with a like quantity of fresh 99 percent alcohol. The material should remain in the alcohol with intermittent agitation for about an hour in order to remove any remaining ethylene carbonate. The time required for sterilization will vary from several minutes for gut of the smallest diameter to 55 minutes for the largest diameter gut.

If the product has not been treated in its ultimate container, it is then air dried, placed in a container and, prior to closing the container, given a supplemental sterilization, as, with carboxide gas, to remove any surface contamination which may have resulted from drying and handling. It will be obvious that if the process is carried out in the container in which it is to be merchandised, the drying and subsequent supplemental sterilization are unnecessary.

As appears from the table above, most of the standard types of surgical gut, as defined in the United States Pharmacopoeia, are required to have a longer absorption period or, in other words, greater resistance to absorption in the body than the Type A which we have referred to above. We achieve this by treating the gut preliminarily or before sterilization by subjecting it to a mild consolidating agent having the effect of retarding absorption. The agent preferred is formaldehyde and this may be used either in aqueous solution or in alcohol. By way of example, in order to produce a surgical gut meeting the specifications of Type C-Medium, size 0, the material may be submerged in a .2 percent aqueous formaldehyde solution for 16 hours, rinsed, and dried under tension. When treated in aqueous solution the gut strings should be strung on a frame during submersion in the bath, to prevent shrinkage. The treated material subsequently is sterilized with ethylene carbonate in the manner hereinbefore set forth.

By varying the treatment the absorption period of the final gut can be made to fall within any recognized standard. By increasing the period of exposure the absorption rate is retarded, while the converse is true if the time of exposure is shortened. In like manner, the concentration of the solution may be varied, however we prefer to keep the concentration within the range of from about .2 percent to .6 percent formaldehyde. Stronger solutions are objectionable in that they tend to stiffen the gut and increase its reactivity.

In place of an aqueous solution of formaldehyde we may use an alcohol solution containing formaldehyde, as, for example, a solution of 80 percent isopropyl (or other non-toxic type) alcohol containing a concentration of .3 percent formaldehyde. The gut should be soaked in this for a period of from 18 to 36 hours, depending upon the results desired. The concentration should preferably be kept within a range of from .2 percent to .5 percent. In the processing of gut to meet the specifications of Type C-Medium, size 2/0 or 0, a .3 percent concentration of formaldehyde may be used and the gut soaked for a period of 24 hours. For size 3/0 we may either increase the strength of the solution to .4 percent or increase the time factor to about 30 hours; for sizes 5/0 and 4/0 we may either increase the strength of the solution to .5 percent or increase the time to 36 hours. For size 1, the treatment may be in a .2 percent solution for 20 hours. The alcohol solution has the advantage of eliminating the necessity of maintaining the gut under tension during treatment. Following the treatment outlined the gut is air dried and is then ready for sterilization.

While we prefer to control the moisture present during sterilization by adding water to the sterilizing liquid, whether this be ethylene carbonate or ethylene oxide, where an alcohol solution containing formaldehyde is used to treat the gut before sterilization, such solution may contain a desired aqueous content and the following step of drying the gut prior to sterilization is omitted to retain moisture in the gut.

As previously indicated, we may also use ethylene oxide as the sterilizing agent. After the preliminary treatment with formaldehyde, the gut is immersed in liquid ethylene oxide at a temperature of about 50° F. (or within the range of from 45° F. to 60° F.) containing about 5 percent by volume of water. The gut should remain in the agent for from 35 minutes to 50 minutes, depending upon the degree of denaturing required. A period of at least 30 minutes is recommended to insure complete sterilization. Following sterilization the gut is washed in alcohol in the manner previously described.

Although we have described preferred methods and forms of our invention, we contemplate that various changes and modifications can be made therein without departing from the invention, the scope of which is indicated by the following claims.

We claim:

1. The method of sterilizing surgical gut comprising treating said gut with a sterilizing agent selected from the group consisting of liquid ethylene oxide and liquid ethylene carbonate at a temperature in the range from 45° C. to 60° C., for a time from about several minutes to about fifty-five minutes until said gut is sterile and removing said sterilizing agent from said gut.

2. The method of sterilizing animal gut which comprises immersing said gut in a liquid sterilizing agent selected from the group consisting of liquid ethylene oxide and liquid ethylene carbonate, said liquid sterilizing agent containing about 5% to 7% by volume of water, at a temperature from about 45° C. to 60° C. for a time from about several minutes to about fifty-five minutes until said gut is sterilized and removing the sterilizing agent from said gut.

3. The method of sterilizing surgical gut to impart an absorption rate of the value of 5 days to 45 days as defined by the United States Pharmacopeia which comprises treating unsterilized gut with liquid ethylene carbonate at the lowest temperature that will prevent said ethylene carbonate from solidifying for a time from about several minutes to about fifty-five minutes until said gut is sterile and removing all ethylene carbonate from said gut.

4. The method of producing a sterile surgical gut having an absorption rate of 5 days to 45 days as defined by the United States Pharmacopeia which comprises immersing unsterilized gut in liquid ethylene carbonate in the presence of about 5% of moisture, and at the lowest temperature to prevent the ethylene carbonate from solidifying, for a time from about several minutes to about fifty-five minutes until said gut is sterile and removing all ethylene carbonate from the gut.

5. The method of producing sterile surgical gut having an absorption rate of from 5 days to 45 days as defined by the United States Pharmacopeia, the steps of treating unsterilized gut with an aqueous solution of formaldehyde having a concentration of from about 0.2% to 0.6% for about 16 hours to retard absorption, removing the formaldehyde solution from said gut, treating said gut with a sterilizing agent selected from the group consisting of ethylene oxide and ethylene carbonate in the presence of about 5% to 7% by volume of water at a temperature of about 45° C. to about 60° C., for a time from several minutes to about fifty-five minutes and washing said gut with alcohol to remove said treating agent.

References Cited in the file of this patent

UNITED STATES PATENTS 2,817,437     George et al.   ---------- Dec. 24, 1957